Dec. 23, 1958 W. R. COYNE 2,865,154
INSERT FEEDING APPARATUS
Filed June 20, 1955 2 Sheets-Sheet 1
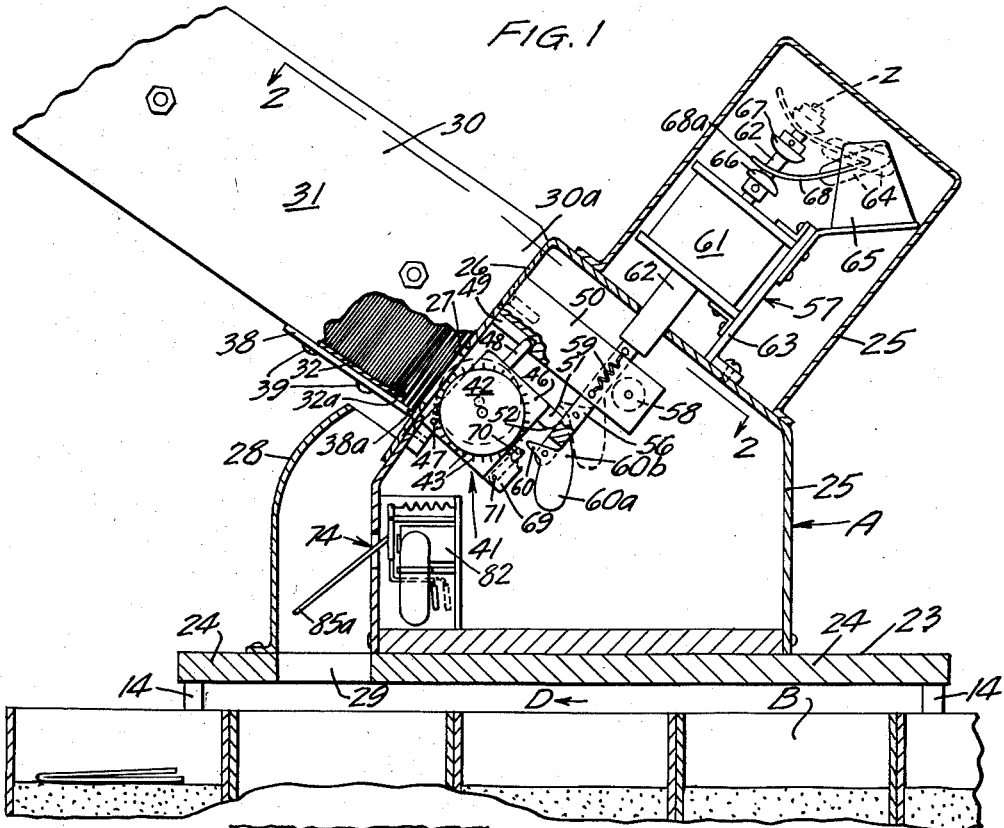
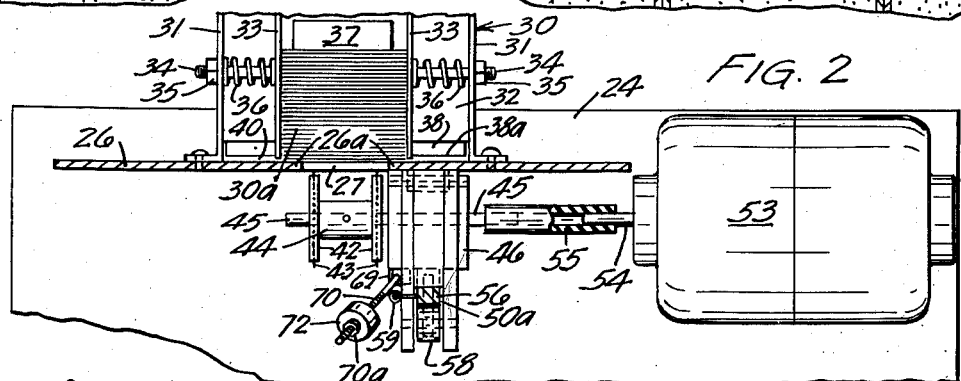
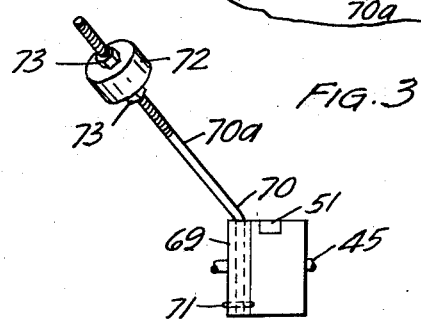
INVENTOR
WILLIAM R. COYNE
BY Williamson, Schroeder, Adams, + Meyers
ATTORNEYS Dec. 23, 1958 W. R. COYNE 2,865,154
INSERT FEEDING APPARATUS
Filed June 20, 1955 2 Sheets-Sheet 2
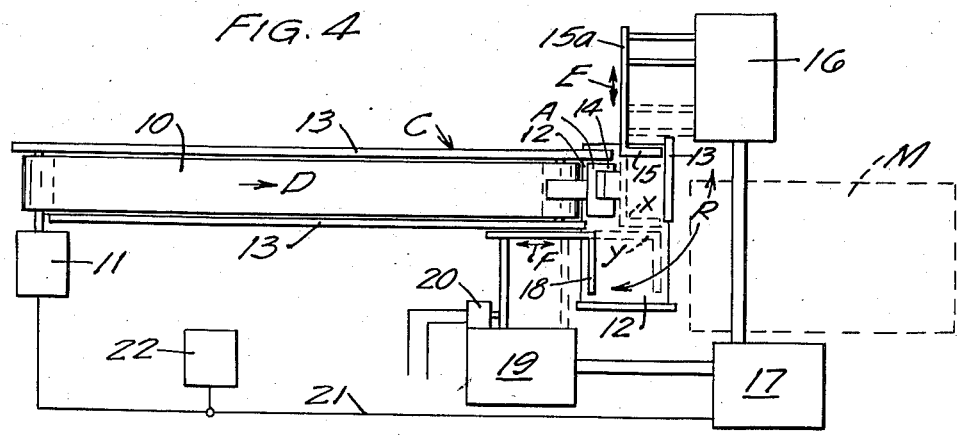
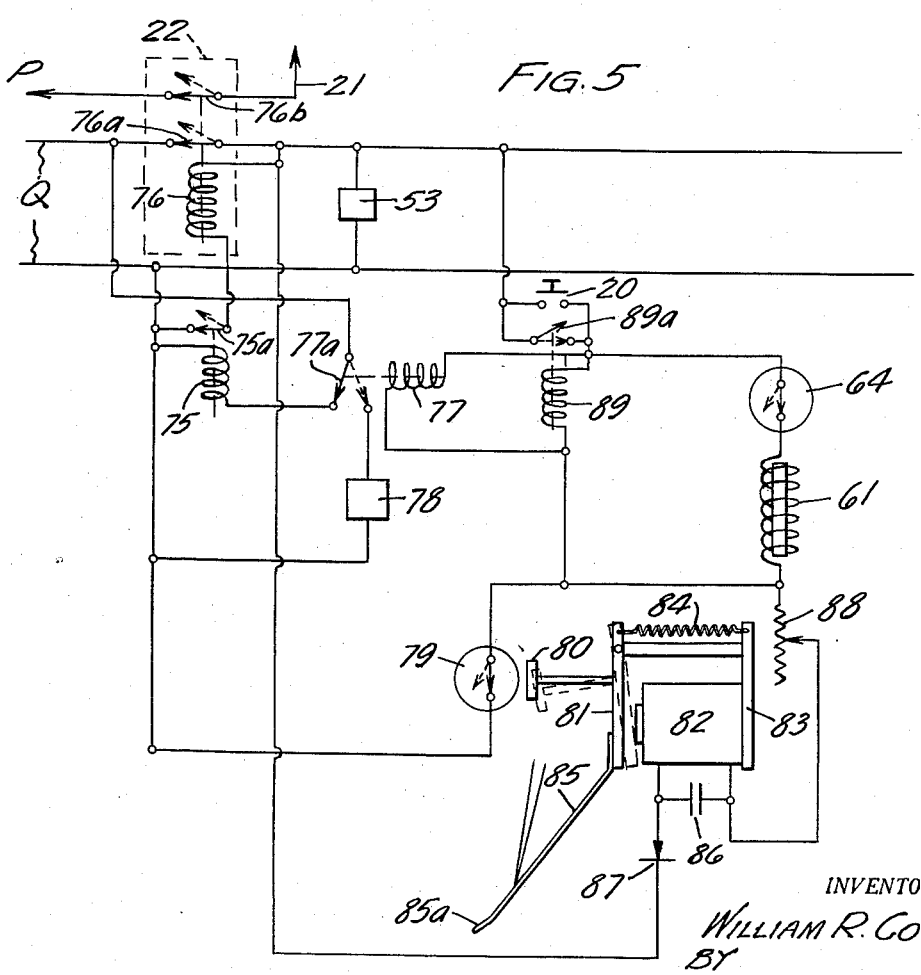
INVENTOR.
WILLIAM R. COYNE
BY
Williamson, Schroeder, Adams & Meyers
ATTORNEYS United States Patent Office 2,865,154
Patented Dec. 23, 1958

2,865,154

INSERT FEEDING APPARATUS

William R. Coyne, Minneapolis, Minn., assignor to The Pillsbury Company, a corporation of Delaware Application June 20, 1955, Serial No. 516,627

11 Claims. (Cl. 53—59)

This invention relates to material-handling machinery and more specifically relates to apparatus for feeding insert members, one at a time, into a series of open-topped containers.

An object of my invention is to provide a new and improved apparatus for feeding insert members such as relatively stiff and heavy brochures and coupons, one at a time, from a stack thereof in synchronism with the movement of containers being conveyed and into which the insert members are to be impelled.

Another object of my invention is the provision of novel apparatus for feeding insert members from a stack thereof for delivery into containers by shifting a high speed friction element into engagement with the outermost brochure in the stack for impelling said insert member laterally across and away from the stack.

Still another object of my invention is the provision, in apparatus for feeding insert members into open-topped containers moving along a conveyor, of improved mechanism for shifting a high speed friction element into engagement with the outermost insert member in the stack to cause the friction element to eject the insert member laterally outwardly away from the stack and toward a container disposed in alignment therewith.

A further object of my invention is the provision in apparatus for ejecting insert members, one at a time, from a supply thereof, into a series of open-topped containers moving along a conveyor, of novel operation monitoring mechanism for indicating the failure, immediately after the same has occurred, of an insert member to be ejected from the supply and into a suitably disposed container when the ejecting mechanism has operated.

These and other objects and advantages of my invention will more fully appear from the following description made in connection with the accompanying drawings wherein like reference characters refer to the same or similar parts throughout the several views and in which:

Fig. 1 is a sectional elevation view of the invention partly broken away taken on a substantially vertical plane and showing the relation of open-topped containers passing therebelow for receiving insert members;

Fig. 2 is a detail section view taken on an inclined plane indicated substantially at 2—2 of Fig. 1 and having portions of the apparatus broken away;

Fig. 3 is a detail elevation view of a portion of the apparatus showing the shiftable bearing for mounting the rotary friction elements;

Fig. 4 is a diagrammatic plan view of the conveyor system for moving containers and showing the plan outline of the insert feeding apparatus in its relation to the conveyor system; and Fig. 5 is a schematic view of the electrical circuit associated with the insert feeding apparatus.

The insert feeding apparatus indicated in general by letter A is associated with a conveyor system indicated in general by letter C for depositing insert members such as brochures or coupons into containers B, shown in vertical section in Fig. 1, which move along the conveyor. Conveyor C includes a conventional type continuous belt conveyor 10 driven by a source of power such as motor 11 in the direction of arrow D toward a supporting plate 12 which is disposed in substantially co-planar relation with the belt conveyor 10. Upstanding side walls 13 may be provided adjacent belt conveyor 10 and plate 12 for retaining the containers thereon. The insert feeding apparatus A is mounted in spaced relation above plate 12 and may be supported as by braces 14 from the upstanding walls 13. Reciprocating ram type conveyors, indicated in general by letter R are provided for moving the containers across plate 12. A ram or pusher 15 having an elongated retaining arm 15a is shiftably mounted above plate 12 adjacent the discharge end of belt conveyor 10 for reciprocating movement in the direction of double ended arrow E across plate 10 between the full line position thereof and the dotted line position X thereof. Ram 15 is connected with a mechanical oscillator 16 which is powered from a suitable source such as motor 17 and which may be of the cam-operated type. In the form shown, the containers move along conveyor 10 and are pushed by adjacent containers onto plate 12 and into proximity with ram 15. Ram 15 will thereupon push the first container laterally across plate 12 and the retaining arm 15a thereof will hold the second container under the insert feeding apparatus for receiving an insert member.

The ram-type conveyor R also includes a second pusher or ram 18 which is mounted above plate 12 for reciprocating movement in the direction of arrow F thereacross between the full line position and the dotted line position Y thereof. Pusher 18 is connected for driving to a mechanical oscillator 19, which may also be of the cam controlled type and which is, in the form shown, connected to the source of power 17 for synchronized operation with oscillator 16 and pusher 15. When ram 15 delivers a container across the plate 12, pusher 18 will thereafter shift into the dotted position Y thereof for pushing the container off the edge of plate 12 into another machine M indicated in dotted line, which may comprise a container sealing machine but comprises no part of the instant invention. A control switch 20 which may be of the type to be pushed to be operated, is mounted for engagement by a portion of ram 18 when the same is shifted to the full line position thereof.

Motors 11 and 17 may be connected by a common power line 21 to power control mechanism 22 which will hereinafter be more fully described.

The insert feeding apparatus A has a frame 23 which is suitably supported as by braces 14 and includes a base 24 and a housing 25 secured to base 24. The housing 25 has an inclined side wall 26 which is provided with an enlarged opening 27 therein. An upstanding guide enclosure 28 is secured to housing 25 adjacent the lower edge of the inclined side wall 26 and the enclosure 28 has an open top and an open bottom. An opening 29 is provided in base 24 and is co-extensive with the opening in guide enclosure 28.

An elongated and inclined magazine 30 having upstanding side walls 31 and a bottom 32, is secured, at the discharge end 30a thereof, to the housing 25 with the discharge end 30a thereof in spaced relation with the inclined side wall 26 and opening 27. Magazine 30, in the form shown, is provided with elongated inner walls which are shiftable inwardly of the magazine 30 and are connected to the outer walls 31 by means of adjustable bolts 34 which extend through the walls 33 and 31 and are adapted to change the relative position thereof by tightening or loosening of nuts 35. Springs 36 are interposed between the side walls 31 and the shiftable side walls 33 to maintain the shiftable wall 33 in fixed relation after the nuts 35 have ben adjusted. The insert member or brochures M are disposed in a stack which is retained between the shiftable walls 33 of the magazine 30.

Suitable means are provided for urging the brochures M toward the discharge end 30a of the magazine 30 and in the form shown, such means comprise a weight 37 which is slidably carried within the magazine 30 in engagement with the insert members M.

The bottom plate 32 of the magazine 30 is terminated in spaced relation with the outer surface of the housing side wall 26. An insert guiding extension plate 38 is adjustably secured to the bottom plate 32 of the magazine 30 by any suitable means such as screws 39, and the plate 38 may be provided with slots to permit the same to move relative to screws 39 when the same are loosened. The inner terminal edge 38a of plate 38 is disposed in spaced relation with the outer surface of the housing side wall 26 so as to define an opening 40 therebetween to permit a single insert member to pass therethrough laterally of the discharge end 30a of the magazine 30. Retaining means are provided slightly inwardly of the discharge end of magazine 30 for restricting outward movement of the insert members and thereby reducing the friction between the adjacent outermost insert members in the magazine. The inner end 32a of the bottom 32 of magazine 30 is sloped slightly upwardly from the extension plate 38 to form an irregularity in the insert guiding inner surface of bottom 32 by forming a ledge over which the insert members or brochures must pass. The upwardly curved inner end 32a of bottom 32 tends to hold back the brochures or insert members and thereby permit the insert members carried on the plate 38 adjacent the inner terminal edge 38a thereof to assume a relatively widely spaced relation which results in reduced friction between adjacent insert members. Movement of the outermost insert member over the inner terminal edge 38a of extension plate 38 will not, by reason of this reduced friction, tend to carry the adjacent insert members or brochures outwardly from the magazine therewith. The portion 26a of the housing side wall 26, which is disposed in closely spaced relation with the opening 27 and which is opposed to the discharge end 30a of magazine 30, provides insert-abutting retaining means or an abutment for preventing discharge of the insert members M longitudinally outwardly from the magazine 30.

Ejector mechanism indicated in general by numeral 41 is mounted on the frame 23 for discharging brochure inserts or insert members, one at a time, laterally outwardly from the discharge end 30a of magazine 30. A pair of high speed, rotary friction elements, each having a plurality of spaced teeth 43 extending radially outwardly, are interconnected by means of a sleeve 44 and are affixed to a rotary shaft 45 in spaced relation with the opening 27 in the housing side wall 26 and in spaced and opposed relation with the discharge end 30a of the magazine 30. The rotary friction elements or wheels 42 are mounted for rotation on an axis extending generally transversely of the magazine 30 and for shifting movement in a direction transversely of their rotation axis.

Shaft 45 is journalled in and supported by a shiftable mounting member or bearing 46 which, in the form shown, comprises a rigid block pivotally mounted on the housing 25 by means of a pivot 47 disposed at the lower edge of bearing 46. The upper portion of bearing 46 is swingable about pivot 47 toward and away from the housing side wall 26 to permit shifting of the rotary friction elements 42 through the opening 27 and into engagement with the outermost insert member in the magazine 30. The shifting movement of bearing 46 is limited by means of an upstanding pin 48 affixed thereto and which is slidable in a slot or guideway 49 formed in a suitable rigid guide or post 50 which is affixed to and rigid with housing 25. Bearing 46 is provided with an abutment 51 disposed on the opposite corner thereof from the pivot 47 and having a downwardly facing abutment surface 52.

It should be noted that the movement of bearing 46 and of rotary friction elements 42 is in a generally upwardly and downwardly direction and that after the bearing 46 is shifted upwardly it will fall back to its normal position by gravity.

Means are provided for rapidly rotating rotary friction elements 42 and in the form shown, such means include a source of rotary power such as motor 53 having a rotary drive element on spindle 54 which is connected to shaft 45 by means of a flexible connection 55, which in the form shown, comprises a length of heavy flexible tubing constructed of material such as rubber. The spindle 54 of motor 53 will not be shifted in a direction transversely of its rotation axis when the rotary friction elements 42 are shifted, and the rotary power will be transmitted therebetween by the flexible connection 55.

Shiftable drive mechanism is provided for shifting the rotary friction elements 42 transversely of their rotation axis. Such mechanism includes drive member 56 and powered mechanism indicated in general by numeral 57. Drive member 56 is slidably mounted through a suitable opening 50a provided in support 50 and extends in a generally upright direction in proximity with the abutment 51 of bearing 46. A rotary bearing wheel is journalled adjacent the opening 50a in the support 50 for engaging and guiding the drive member 56 in reciprocation thereof. The powered mechanism 57 will, when energized, pull the drive member 56 upwardly, and drive member 56 will be moved downwardly after the powered mechanism 57 is de-energized, by means of a spring 59 which is connected to drive member 56 and support 50.

A lug 60 protrudes laterally outwardly from the lower end of drive member 56 and is swingably connected thereto for limited movement. The lower portion 60a of lug 60 is weighted and lug 60 is also provided with an upper abutting portion 60b for engaging the drive member 56 and limiting rotation of lug 60. As seen in Fig. 1, lug 60 is prevented from swinging in a counter-clockwise direction from the full line position shown, and is free to swing in a clockwise direction. Lug 60 is shiftable with drive member 56 into engagement with the abutting surface 52 of abutment 51 for shifting bearing 46 upwardly. As bearing 46 and abutment 51 have shifted about pivot 47, lug 60 will pass thereby, and after bearing 46 and abutment 51 have returned to the normal full line position shown, lug 60 will, when shifted downwardly with drive member 56, engage abutment 51 and swing in a clockwise direction into an out-of-the-way position and will pass by abutment 51. The weighted portion 60a will thereafter return the lug 60 to its outstanding position.

The powered mechanism 57 comprises, in the form shown, a solenoid having a coil 61 and a shiftable armature 62 shiftably mounted centrally of coil 61 and connected to the drive member 56 for shifting the same. The solenoid coil 61 is suitably supported as by brackets 63 to the housing 25.

Control means are provided for de-energizing solenoid coil 61 immediately after the same has been energized and immediately after the armature 62 thereof has been shifted upwardly into dotted position Z thereof. In the form shown, such means include a mercury switch 64 swingably mounted on a suitable bracket 65 which is secured to the solenoid frame 63. Mercury switch 64 is connected in series with the solenoid winding 61 as will hereinafter be more fully described. A pair of spaced stop elements 66 and 67 are secured to solenoid armature 62 in spaced relation with each other. A rigid control arm 68 is secured to the tube of the mercury switch 64 to control the tilting thereof and the outer end portion 68a of the control arm 68 is disposed in close proximity with the upper armature 62 and with the stop elements 66 and 67 thereon. When the solenoid coil 61 is energized, the armature 62 will shift upwardly and stop element 66 will shift the control arm 68 upwardly to tilt the mercury switch 64 and cause the same to open. When mercury switch 64 is opened solenoid coil 61 is de-energized and spring 59 will tend to pull the armature 62 downwardly again. The inertia imparted to control arm 68 and mercury switch 64 by the rapid upward shifting of the armature 62 will cause mercury switch 64 to continue its tilting until the control arm 68 shifts upwardly into engagement with stop element 67. The stop element 67 will thereafter drive the control arm downwardly to tilt the mercury switch for re-closing the same. Because of the free movement of control arm 68 relative to the armature 62, mercury switch 64 will remain in open condition for a period of short duration before being closed again. The stop elements 66 and 67 and control arm 68 thereby provide a mechanical time delay device for controlling the operation of mercury switch 64.

Switch 20 which is mounted for operation by movement of ram 18 of the conveyor is directly connected to solenoid coil 61 to provide operable synchronizing connection between the conveyor and the drive mechanism 57. Solenoid winding 61 will thereby be energized each time ram 18 is retracted to its full line position.

Means are provided for instantaneously holding and urging the friction elements 42 in engagement with the outermost brochure in magazine 30. In the form shown such means include an elongated mounting 69 secured on the back side of bearing 46 and having an elongated opening extending therethrough. An elongated rod 70 extends downwardly through the opening in mounting 65 and is swingably secured thereto by a pivot 71. The central opening in mounting 69 is of substantially greater cross section than is rod 70 and therefore rod 70 is free to swing slightly between predetermined limits about pivot 71. The upper portion 70a of rod 70 is bent outwardly from bearing 46 and is threaded for adjustably carrying a weight 72 which is secured thereon by lock nut 73. When bearing 46 is shifted by drive member 56 to move the rotary friction elements into engagement with the outermost insert member in magazine 30, rod 70 will remain in its rearwardly swung position and when the bearing 46 has stopped its shifting movement due to friction wheels 42 engaging the insert member the inertia of weight 72 will swing arm 70 upwardly to cause the same to impart additional force to bearing 46 tending to, at least instantaneously, hold the bearing 46 and friction wheels 42 in their upwardly shifted position.

Operation monitoring mechanism indicated in general by numeral 74 provides an indication of the failure of an insert member to be ejected from the magazine each time the ejector mechanism 41 is operated. The monitoring mechanism includes a normally energized power control relay 75 having contacts 75a for controlling a normally energized power relay 76. Power relay 76 has contacts 76a and 76b which respectively control the insert feeding mechanism and the motors 17 and 11 of the conveyor system C. The power relay 76 and its associated contacts comprise the power control mechanism 22 which is connected by power lines 21 to the motors 11 and 17. The monitoring mechanism also includes a time delay relay 77 which is connected for energization each time the ejector mechanism 41 is operated and which has a contact 77a normally maintaining power control relay 75 energized. The time delay relay 77 is of a conventional type wherein the contacts 77a associated therewith are shifted after a period of short duration subsequent to the energization thereof. A warning device 78 is connected for operation by the contact 77a of the time device when shifted.

The monitoring mechanism also includes a magnetic type switch 79 of a conventional type having spring biased contacts which normally urge themselves to open condition and which are closed when a permanent magnet 80 is shifted into close proximity therewith. The switch 79 is connected for de-energizing the coil 77 of the time delay relay. Permanent magnet 80 is secured to the shiftable armature 81 of a relay type coil 82 which is mounted on a suitable frame 83. The armature 81 is maintained in its normal position by a biasing spring 84 which is connected thereto and to frame 83 for normally maintaining permanent magnet 80 in close proximity with magnetic switch 79 and thereby maintaining said switch in closed condition. A trip arm or trip release 85 is also secured to the shiftable armature 81 and has a portion 85a thereof disposed in alignment with the discharge path of insert members discharged from the magazine 30 and disposed within the guiding enclosure 28. A condenser 86 is connected in parallel across the coil 82 and a selenium rectifier 87 is connected in series with the coil 82 and condenser 86. A potentiometer 88 is also connected in series with the coil 82 and condenser 86 to vary the voltage applied to the coil. Potentiometer 88 is adjusted to provide current in coil 82 so that the magnetic field thereof will be slightly insufficient for the purposes of drawing the shiftable armature 81 out of its normal full line position. The impact of an insert member engaging the trip arm 85 will cause the armature 81 to shift to move the permanent magnet 80 away from magnetic switch 79 to permit the same to open and thereby de-energize the coil 77 of the time delay device.

A holding relay is provided for bypassing the control switch 20 and for maintaining the circuits energized thereby in energized condition until the magnetic switch 79 is opened. The coil of relay 89 is connected in series with the magnetic switch 79 to be de-energized thereby when opened and the contacts 89a thereof are connected to bypass switch 20.

The following is a complete description of the electrical circuit connected with the apparatus. A source of power Q is provided for operating the insert feeder mechanism and a source of power P is provided for energizing the conveyor motors 11 and 17. Motors 11 and 17 are connected through power line 21 and through relay contacts 76b to the source of power P. One side of the source of power Q is connected through power relay contact 76a to the insert feeder apparatus. The coil 76 of the power relay is connected to the source of power Q through the normally closed contacts 75a of the power control relay 75 and through the contact 76a. The high speed motor 53 for rotating the friction wheels 42 is connected across the source of power Q through contacts 76a. The power control relay 75 is connected across the source of power Q through contact 76a and the contact 77a normally maintained in the full line position shown. One side of switch 20 is connected to one side of the source of power Q through contact 76a. The other side of switch 20 is connected to three different circuits to be simultaneously energized with closing thereof. One side of the holding coil 89 is connected to switch 20 and the other side thereof is connected through magnetic switch 79 to the other side of the source of power. One side of the time delay relay 77 is connected to switch 20 and the other side thereof is connected through the other side of the source of power Q.

One side of the solenoid winding 61 is connected through the normally closed mercury switch 64 to one side of switch 20 and the other side of the solenoid winding 61 is connected through magnetic switch 79 to the other side of the source of power Q.

One side of the coil 82 is connected through rectifier 87 and relay contact 76a to one side of the source of power Q, and the other side of coil 82 is connected through potentiometer 88 and magnetic switch 79 to the other side of the source of power Q.

*Operation*

The power relay 76 will be closed as by manual means to energize the motors 11, 17 and 53 and to energize the power control relay 75 and power relay 76. Containers will thereupon move along the conveyor C in the direction of arrow D and the reciprocating pusher 18 will close switch 20. As the time ram 18 is retracted so as to close switch 20 a container B will be maintained in stationary position under the insert feeder apparatus A by other containers being urged thereagainst along belt conveyor 10 and because the container under apparatus A will be engaged and retained by the retaining arm 15a of ram 15 which is at that time being projected forwardly. When switch 20 is closed, the holding coil 89 is energized to close the contact thereof and bypass switch 20 to permit the same to be opened. The time delay relay 77 will be energized and will shift the contacts 77a thereof after a period of short duration unless the coil 77 thereof is de-energized before the end of such a period. Solenoid winding 61 is energized to cause the armature 62 thereof to shift upwardly causing lug 60 to impact abutment 51 and urge bearing 46 and the toothed wheels 42 upwardly. The rapidly rotating wheels 42 which shift through the opening 27 in the housing side wall 26 will engage the outermost insert member with the teeth thereof for an instant. The outermost brochure will then be impelled by the rotating teeth outwardly through the opening 40. The guide plate 38 will retain the second insert member in the stack and preclude the same from being discharged due to friction between the first and second insert members. When the upward or forward motion of the rotary friction elements 42 has stopped, weight 72 will shift rod 70 for instantaneously holding the friction elements 42 in engagement with the outermost brochure. By the time the outermost brochure in the stack has been given a rapid start laterally through opening 40, bearing 46 and friction wheels 42 will begin to fall back down by gravity to their normal full line position shown in Fig. 1.

After lug 60 has impacted abutment 51, abutment 51 will shift out of the way and lug 60 will move upwardly therefrom. When the drive member 56 and armature 62 have reached their upper limit of reciprocation, mercury switch 64 will have been opened and solenoid winding 61 will be de-energized. Spring 59 will thereafter pull the drive member 56 and armature 62 downwardly. The mechanical time delay mechanism associated with mercury switch 64 will permit the same to maintain in open condition while armature 62 starts downwardly.

Before the mercury switch 64 has reclosed the insert member discharged from the magazine will strike the trip release 85 to shift the same and to shift the permanent magnet 80 away from magnetic switch 79, causing the same to open. When switch 79 is opened, coil 82 is disconnected, but current will flow from the discharging condenser 86 through coil 82 for holding the shiftable armature 81 in shifted position for a short period. Magnetic switch 79 will thereby be maintained in open position for such a short period.

The opening of magnetic switch 79 also disconnects the coil 77 of the time delay device and while the switch 79 is maintained in open position the coil 77 will be permitted to completely de-energize. By the time the insert member has been discharged and the magnetic switch 79 is opened, the time delay relay 7 will not have operated and the power control relay 75 and the power relay 76 will be maintained in energized condition.

The opening of magnetic switch 79 also causes de-energization of the holding coil 89 which causes the opening of its contacts 89a. After the opening of magnetic switch 79 the mercury switch 64 will reclose due to the downward shifting of armature 62. After the holding contacts 89a have re-opened, magnetic switch 79 will reclose due to completion of discharge condenser 85 and the complete de-energization of coil 82, which thereupon releases the armature thereof and causes shifting of the permanent magnet. If, for some reason such as the lack of insert members in magazine 30 or the failure of insert members to readily slide down the magazine because of a few out-sized insert members, an insert member is not discharged when switch 20 is closed and ejector mechanism 41 is operated, magnetic switch 79 will remain closed and the time delay relay 77 will not be de-energized before it operates. Several seconds will elapse between the operation of solenoid 61 and the ejector mechanism 41, and the operation of time delay relay 77. During this several second interval, the solenoid armature 62 will reassume its downwardly shifted position and the mercury switch 64 will reclose and will cause the solenoid 61 and ejector mechanism 41 to operate again. If a brochure insert is still not discharged to cause magnetic switch 79 to open, the solenoid 61 and ejector mechanism operate several times before the time delay relay 77 operates in an attempt to discharge a brochure. Of course if, in one of its attempts, the ejector mechanism 41 is successful in discharging an insert member, the magnetic switch 79 will be opened and the time delay relay 77 will be de-energized and the insert feeding apparatus will continue operation in its normal fashion. If, on the other hand, the repeated operation of the solenoid 61 and ejector mechanism 41 is unsuccessful in producing the discharge of an insert member, the interval before the time delay relay 77 operates will pass and the same will operate to shift its contacts 77a. When the time delay relay 77 operates, power control relay 75 is de-energized and the contacts 75a thereof are opened for de-energization of power relay 76 and a corresponding opening of the contacts 76a and 75b thereof. Opening of contacts 76b causes the conveyor system C to shut down, and opening of contacts 76a causes de-energization of the insert feeder mechanism including motor 53 and the ejector mechanism 41.

In addition, operation of time delay relay 77 causes energization of the warning device 78, and sounds a warning to apprise the operator of the mechanism of the failure thereof to operate. When an insert member has been ejected into the container directly beneath the opening 29 in the base 24, the ram 15 will have been retracted to its full line position in Fig. 4 and the container having just received an insert member will be moved in front of ram 15 and a new container will be urged under the insert feeder apparatus A by other containers being urged from belt conveyor 10.

When brochures of a different size are to be inserted into the containers, the shiftable side walls 33 in the magazine may be moved inwardly or outwardly to accommodate the new sized brochures. The guide plate 38 may be shifted in the appropriate direction toward or away from the abutment 26a to change the size of opening 40 and permit the new brochures to be discharbed one at a time therethrough.

It has been found in the operation of this device that insert members may be fed out of the magazine and into containers moving along conveyor system C at the rate of approximately 30 insert members per minute.

It will be seen that I have provided new and improved apparatus for feeding insert members one at a time from a stack thereof, into open-topped containers moving along a conveyor and for feeding such insert members in synchronism with movement of the containers along the conveyor.

It should also be noted that I have provided novel apparatus for feeding insert members from a stack thereof into containers by shifting a high speed rotary friction element into engagement with the outermost insert member in the stack for discharging the insert member across the end of the stack and into a container disposed in alignment therebelow.

It should also be apparent that I have provided an apparatus for ejecting insert members from a magazine holding a stack thereof and into a series of open-topped containers moving along a conveyor, mechanism for monitoring the discharge of insert members from the apparatus for indicating to the operator of the mechanism that an insert member has not been ejected into a particular container when such is the case and for shutting down the entire mechanism including the conveyor for carrying the containers, to permit correction of the cause of the failure.

It will, of course, be understood that various changes may be made in the form, detail, arrangement and proportion of the parts without departing from the scope of my invention which consists of the matter described herein and set forth in the appended claims.

What is claimed is:

1. Apparatus for feeding insert members, one at a time, into a series of open-topped containers from a stack of insert members, said apparatus comprising a frame, a magazine mounted on said frame for holding such a stack of insert members and having a discharge end, insert-abutting retaining means disposed in spaced relation with the discharge end of such a magazine to preclude discharge of such insert members longitudinally outwardly thereof, a high speed friction element supported by said frame opposite the discharge end of said magazine and moving in a direction laterally thereacross, said friction element being shiftable toward and away from the discharge end of said magazine and into instantaneous engagement with and release from the outermost insert member therein for impelling the same laterally across and away from the discharge end of said magazine and into the open mouth of such a container, and means mounted on said frame for rapidly moving said friction element, and driving mechanism having instantaneously releasing driving connection with said friction element and urging the same toward the magazine whereby to produce instantaneous engagement of the friction element with the outermost brochure.

2. Apparatus for feeding insert members, one at a time, into a series of open-topped containers carried by a conveyor system, said apparatus comprising a frame, a magazine mounted on said frame for holding a stack of such insert members and having a discharge end, an abutment mounted on said frame and being disposed in spaced and opposed relation with the discharge end of said magazine to prevent discharge of such insert members longitudinally outwardly thereof, said abutment having an opening therethrough, a high speed rotary friction element mounted adjacent said abutment and in alignment with the opening therethrough and on an axis extending transversely of said magazine, said friction element being shiftable through the opening in said abutment and toward the outermost insert member for engaging the same and impelling the same laterally across and away from the discharge end of the magazine and into a container disposed in alignment therewith on such a conveyor, means connected wiht said friction element for rotating the same at high speed, a mounting member shiftably mounted on said frame and carrying said friction element, a shiftable drive member mounted on said frame and being constructed and arranged for shifting said mounting member toward the magazine for shifting said rotary friction element, and drive mechanism connected with said drive member for shifting the same and including an operable connection connectible to the conveyor system for synchronizing operation of said drive mechanism therewith, whereby the friction element will be shifted in synchronism with the conveyor for impelling an insert member, one at a time, into containers carried thereby.

3. Apparatus for feeding insert members, one at a time, into a series of open-topped containers caired by a conveyor system, said apparatus comprising a frame, a magazine mounted on said frame for holding a stack of such insert members and having a discharge end, insert-abutting retaining means disposed in spaced and opposed relation with the discharge end of said magazine to preclude discharge of such insert members longitudinally outwardly thereof, a high speed rotary friction element mounted on a rotation axis extending transversely of said magazine and disposed in spaced relation with the discharge end thereof, means mounted on said frame for rotating said friction element at high speed, a bearing supporting said friction element and being pivotally mounted on said frame for movement transversely of the rotation axis of said friction element, said bearing having an abutment, a drive member shiftably mounted on said frame for movement transversely of said rotation axis and having an outstanding lug swingably mounted thereon for limited movement for engaging and moving said abutment and passing thereby when shifted in one direction and for swinging out of the way to freely pass thereby when shifted in the opposite direction, means for limiting swinging movement of said lug, and drive mechanism connected with said drive member for shifting the same and including a synchronizing connection connectible with such a conveyor for rendering the drive mechanism operative in timed relation with the conveyor, whereby the shifting of said friction element and the discharge of insert members, one at a time into the containers will be synchronized with operation of the conveyor.

4. Apparatus for feeding insert members, one at a time, into a series of open-topped containers carried by a conveyor system, said apparatus comprising a frame, a magazine mounted on said frame for holding a stack of such insert members and having a discharge end, insert-abutting retaining means supported on said frame in opposed relation with the discharge end of said magazine and restricting discharge of such insert members longitudinally therefrom, powered ejector mechanism mounted on said frame and including a shiftable ejector mounted adjacent the discharge end of said magazine for engaging and impelling the outermost insert member thereof laterally outwardly therefrom, and said ejector mechanism including a control device for rendering said mechanism operative, said control device being mounted for operation by the conveyor in synchronism therewith, an operation monitoring mechanism for indicating failure of an insert member to be discharged from the magazine with operation of said ejector, said monitoring mechanism including a delayed action control adapted to operate after a period of short duration subsequent to the energization thereof, said delayed action control being connected with said ejector mechanism to be energized each time the same is operated, a de-energizing switch connected with said delayed action control, a shiftable trip release intimately associated with said switch for operating the same and having a portion thereof disposed transversely of the discharge end of said magazine and in alignment with the discharge path of insert members impelled therefrom to be impacted and shifted thereby for operating said switch, and a time delay holding device connected with said trip release for maintaining the same in shifted position for a period of short duration after said release has been impacted by a discharging insert member, whereby said delayed action control will be permitted to completely de-energize for the next cycle of operation while said trip release is held in shifted position.

5. The structure recited in claim 2 wherein said drive mechanism includes a solenoid having a shiftable armature, a de-energizing switch connected with said solenoid for controlling the same, and a time delay device connected between said armature and said switch for instantly opening the switch when the armature is driven by said solenoid and delaying the reclosing of said switch after the solenoid is de-energized.

6. Apparatus for feeding insert members one at a time into a series of open-topped containers from a stack of such insert members, said apparatus comprising a frame, a magazine mounted on said frame for holding such a stack of insert members and having a discharge end, insert abutting means disposed in spaced relation with the discharge end of said magazine to preclude discharge of insert members outwardly thereof, retaining means spaced inwardly from the discharge end of said magazine restricting movement of such insert members toward said abutting means for preventing crowding of such insert members at the discharge end of the magazine and reducing friction between adjacent insert members, a high speed friction element mounted adjacent the discharge end of the magazine and moving in a direction laterally thereacross, said friction element being shiftable toward and away from the discharge end of said magazine and into engagement with the outermost insert member for impelling the same laterally across and away from the discharge end of said magazine, means for rapidly moving said friction element and shiftable mechanism for shifting said element toward the discharge end of said mechanism, whereby reduced friction between the adjacent outermost insert members restricts undesired discharge of insert members adjacent the outermost insert member being positively engaged and driven by said friction element.

7. Apparatus for feeding insert members one at a time into a series of open-topped containers from a stack of such insert members, said apparatus comprising a frame, a magazine mounted on said frame for holding such a stack of insert members and having a discharge end, insert abutting means disposed in spaced relation with the discharge end of said magazine to preclude discharge of insert members outwardly thereof, said magazine having inner insert-guiding surfaces, one of said surfaces having an irregularity therein for engaging insert members and restricting movement thereof toward said abutting means and thereby reducing friction between the adjacent outermost insert members, and an insert ejecting mechanism mounted adjacent the discharge end of the magazine and including a movable insert-engaging ejector element for impelling the outermost insert member laterally across and away from the discharge end of said magazine, whereby the reduced friction between the adjacent outermost insert members at the discharge end of the magazine facilitates ready discharging of the outermost insert member engaged and driven by said ejector element.

8. Apparatus for feeding insert members one at a time into a series of open-topped containers from a stack of such insert members, said apparatus comprising a frame, a magazine mounted on said frame for holding such a stack of insert members and having a discharge end, abutment means disposed in spaced relation with the discharge end of said magazine for engaging and precluding discharge of such insert members outwardly thereof, said magazine having a bottom with an inner end terminating in spaced relation with said abutment means, a bottom extension plate extending beyond the inner end of said bottom and terminating in spaced relation with said abutment means for carrying the adjacent outermost insert members in the magazine, the inner end of the bottom of said magazine sloping upwardly away from said extension plate to form an insert retaining ledge for restricting movement of such insert members toward said abutment means and thereby reducing friction between such insert members carried on said extension plate, a high speed friction element mounted adjacent the discharge end of the magazine and moving in a direction laterally thereacross, said friction element being shiftable toward and away from the discharge end of said magazine and into engagement with the outermost insert member for impelling the same laterally across and away from the discharge end of said magazine, means for rapidly moving said friction element, and shiftable mechanism for shifting said friction element toward the discharge end of the magazine.

9. Apparatus for feeding insert members one at a time into a series of open-topped containers from a stack of such insert members, said apparatus comprising a frame, a magazine mounted on said frame for holding such a stack of insert members and having a discharge end, insert-abutting retaining means disposed in spaced relation with the discharge end of such a magazine to preclude discharge of such insert members longitudinally outwardly thereof, a high speed rotary friction wheel supported by said frame opposite the discharge end of said magazine and on an axis extending generally transversely of said magazine, said friction wheel being shiftable toward and away from the discharge end of said magazine and into engagement with the outermost insert member therein for impelling laterally across and away from the discharge end of said magazine and into the open mouth of such a container disposed in alignment therewith, means for rapidly rotating said friction wheel and including a rotary drive element journalled on said frame, and a flexible connection interposed between said drive element and said friction wheel to permit shifting of said friction wheel transversely of its rotation axis.

10. Apparatus for feeding insert members one at a time into a series of open-topped containers carried by a conveyor system, said apparatus comprising a frame, a magazine on the frame and holding a stack of such insert members and having a discharge end, insert abutting retaining means disposed in spaced relation with the discharge end of the magazine and precluding discharge of such insert members longitudinally outwardly thereof, a high speed friction element supported by the frame opposite the discharge end of said magazine and moving in a direction laterally thereacross, said friction element being shiftable toward and away from the discharge end of the magazine for engaging and impelling the outermost insert member laterally across and away from the discharge end of the magazine, means connected with said friction element for moving the same at high speed, a mounting member shiftably mounted on said frame and carrying said friction element, a shiftable drive member mounted on said frame and being arranged for shifting said mounting member toward the magazine and for shifting said friction element, and drive mechanism connected with said drive member for shifting the same and including an operable connection connectible to the conveyor system for synchronizing operation of said drive mechanism therewith, whereby the friction element will be shifted in synchronization with the conveyor for impelling insert members one at a time from the magazine.

11. In apparatus for feeding insert members one at a time into a series of open-topped containers carried by a conveyor system, said apparatus comprising a frame, a magazine mounted on said frame for holding a stack of such insert members and having a discharge end, a periodically operable ejector mechanism on the frame and adjacent the discharge end of the magazine and constructed for engaging and ejecting insert members one at a time outwardly from the magazine, a control device connected in controlling relation with said ejector mechanism for periodically operating the same and mounted for operation by the conveyor in synchronization therewith, an operation monitoring mechanism for indicating failure of an insert member to be discharged from the magazine when the ejector mechanism is operated, said monitoring mechanism including an operation-failure indicator and also including a delayed-action control constructed to operate after a period of short duration subsequent to the energization thereof, said delayed-action control being connected in controlling relation with said indicator for operating the same and the delayed-action control being connected in controlled relation with said ejector mechanism to be energized each time the same is operated, an interrupting device connected with said delayed-action control for de-energizing the same, and said interrupting device having an insert-sensing element spaced outwardly from the discharge end of the magazine and operating said interrupting device when an ejected insert member is sensed, whereby said indicator operates only when the ejector mechanism operates and fails to eject an insert member.

References Cited in the file of this patent

UNITED STATES PATENTS

| | | |
|---|---|---|
| 1,064,940 | Thompson | June 7, 1913 |
| 2,234,342 | Goodell et al. | Mar. 11, 1941 |
| 2,265,007 | Ryan | Dec. 2, 1941 |